(12) United States Patent
Sakugawa

(10) Patent No.: US 8,682,500 B2
(45) Date of Patent: Mar. 25, 2014

(54) DRIVING ASSISTANCE APPARATUS

(75) Inventor: Jun Sakugawa, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/059,431

(22) PCT Filed: Apr. 21, 2009

(86) PCT No.: PCT/JP2009/057921
§ 371 (c)(1),
(2), (4) Date: Feb. 17, 2011

(87) PCT Pub. No.: WO2010/122639
PCT Pub. Date: Oct. 28, 2010

(65) Prior Publication Data
US 2011/0137488 A1    Jun. 9, 2011

(51) Int. Cl.
*G05D 1/00* (2006.01)
(52) U.S. Cl.
USPC ................................... 701/1; 701/23; 701/36
(58) Field of Classification Search
USPC ......... 701/1, 10, 58, 68, 93, 96, 300, 301, 23, 701/36
See application file for complete search history.

(56) References Cited

U.S. PATENT DOCUMENTS

| | | | |
|---|---|---|---|
| 6,571,176 B1 * | 5/2003 | Shinmura et al. | 701/301 |
| 7,734,419 B2 * | 6/2010 | Kondoh | 701/301 |
| 7,755,511 B2 * | 7/2010 | Yamamoto et al. | 340/932.2 |
| 7,765,066 B2 * | 7/2010 | Braeuchle et al. | 701/301 |
| 2003/0233187 A1 * | 12/2003 | Egami | 701/96 |
| 2003/0236602 A1 * | 12/2003 | Kuge et al. | 701/36 |
| 2005/0024258 A1 * | 2/2005 | Matsuoka et al. | 342/70 |
| 2005/0228588 A1 | 10/2005 | Braeuchle et al. | |
| 2007/0027597 A1 | 2/2007 | Breuel et al. | |
| 2009/0157247 A1 * | 6/2009 | Sjogren et al. | 701/23 |

(Continued)

FOREIGN PATENT DOCUMENTS

| | | |
|---|---|---|
| DE | 10218010 A1 | 11/2003 |
| DE | 10351986 A1 | 6/2005 |

(Continued)

OTHER PUBLICATIONS

International Preliminary Report on Patentability issued Nov. 17, 2011 in PCT/JP2009/057921.

(Continued)

*Primary Examiner* — Thomas Black
*Assistant Examiner* — Shardul Patel
(74) *Attorney, Agent, or Firm* — Oblon, Spivak, McClelland, Maier & Neustadt, L.L.P.

(57) ABSTRACT

A driving assistance apparatus is a lane keeping apparatus that performs a vehicle driving assistance so that a vehicle runs along a set target course, and includes a vehicle control ECU; a camera; an image ECU; a steering torque sensor; and a steering torque applying unit. The vehicle control ECU includes a parallel running vehicle trajectory estimating unit which estimates the trajectory of the parallel running vehicle running on the adjacent lane and a target course correcting unit which corrects the target course of the own vehicle on the basis of the estimation trajectory of the parallel running vehicle. Since the target course of the own vehicle is corrected on the basis of the estimated trajectory of the parallel running vehicle, it is possible to sufficiently reduce the driver's anxiety with respect to the parallel running vehicle.

20 Claims, 5 Drawing Sheets

(56) References Cited

U.S. PATENT DOCUMENTS

| | | | |
|---|---|---|---|
| 2009/0171533 A1* | 7/2009 | Kataoka | 701/41 |
| 2009/0326752 A1* | 12/2009 | Staempfle et al. | 701/29 |
| 2010/0036578 A1 | 2/2010 | Taguchi et al. | |

FOREIGN PATENT DOCUMENTS

| | | |
|---|---|---|
| EP | 1 527 941 | 5/2005 |
| EP | 1 527 973 | 5/2005 |
| EP | 2 025 577 A1 | 2/2009 |
| JP | 2001-1927 A | 1/2001 |
| JP | 2001 48035 | 2/2001 |
| JP | 2001 48036 | 2/2001 |
| JP | 2002-25000 A | 1/2002 |
| JP | 2002 274402 | 9/2002 |
| JP | 2002 331849 | 11/2002 |
| JP | 2004-136787 A | 5/2004 |
| JP | 2004-199286 A | 7/2004 |
| JP | 2004-206451 A | 7/2004 |
| JP | 2005-62912 A | 3/2005 |
| JP | 2005 524135 | 6/2005 |
| JP | 2005 324782 | 11/2005 |
| JP | 2006 321299 | 11/2006 |
| JP | 2007 534041 | 11/2007 |
| JP | 2007 326447 | 12/2007 |
| JP | 2008 123197 | 5/2008 |

OTHER PUBLICATIONS

Notice of Allowance issued on May 13, 2013 in related U.S. Appl. No. 12/227,396.

Office Action dated Nov. 8, 2012 issued in corresponding U.S. Appl. No. 12/227,396.

* cited by examiner

DRIVING ASSISTANCE APPARATUS

TECHNICAL FIELD

The present invention relates to a driving assistance apparatus that controls a vehicle so that the vehicle runs along a set target course.

BACKGROUND ART

For some time, as a driving assistance apparatus for controlling a vehicle so as to run along a set target course, there has been known a driving assistance apparatus disclosed in, for example, Japanese Unexamined Patent Application Publication No. 2007-326447, the driving assistance apparatus including: a sensor detecting a steering torque as a steering input value obtained by the driver's operation; and an ECU correcting a target course when the detected steering torque value is a reference value or more. According to the apparatus, when the driver's steering direction is a direction moving away from a parallel running vehicle present on the adjacent lane, the ECU corrects the target course to a direction moving away from the parallel running vehicle, thereby suppressing the driver's uncomfortable feeling.

CITATION LIST

Patent Literature

Patent Literature 1: Japanese Unexamined Patent Application Publication No. 2007-326447

SUMMARY OF INVENTION

Technical Problem

However, in the known apparatus, since the target course is corrected on the basis of the driver's steering input, a problem arises in that a driver's anxiety with respect to the parallel running vehicle may not be sufficiently reduced.

The invention is contrived to solve this technical problem, and an object of the invention is to provide a driving assistance apparatus capable of reducing a driver's anxiety.

Solution to Problem

Provided is a driving assistance apparatus that controls a vehicle so that the vehicle runs along a set target course, the driving assistance apparatus including: an estimation means for estimating a trajectory of a parallel running vehicle running on an adjacent lane; and a correction means for correcting a target course of an own vehicle on the basis of the trajectory of the parallel running vehicle estimated by the estimation means.

According to the invention, the trajectory of the parallel running vehicle running on the adjacent lane is estimated, and the target course of the own vehicle is corrected on the basis of the estimated trajectory, thereby sufficiently reducing the driver's anxiety with respect to the parallel running vehicle. As a result, it is possible to realize the driving assistance of reducing the driver's anxiety.

In the driving assistance apparatus according to the invention, the correction means may correct the target course of the own vehicle on the basis of the lateral speed of the parallel running vehicle. In this case, it is possible to sufficiently reduce the driver's anxiety with respect to the parallel running vehicle.

In the driving assistance apparatus according to the invention, the correction means may correct the target course of the own vehicle on the basis of the running load of the parallel running vehicle. In this case, it is possible to sufficiently reduce the driver's anxiety with respect to the parallel running vehicle.

In the driving assistance apparatus according to the invention, the running load may be obtained on the basis of a direction and a magnitude of road curvature in front of the parallel running vehicle. In this case, it is possible to sufficiently reduce the driver's anxiety with respect to the parallel running vehicle.

In the driving assistance apparatus according to the invention, the correction means may correct the target course of the own vehicle on the basis of movement energy of the parallel running vehicle. In this case, it is possible to sufficiently reduce the driver's anxiety with respect to the parallel running vehicle.

In the driving assistance apparatus according to the invention, the correction means may correct the target course of the own vehicle on the basis of a driver's steering input of the own vehicle when the parallel running vehicle is not present. In this case, since the target course is corrected on the basis of the driver's sensation when the parallel running vehicle is not present, it is possible to realize the driving assistance of reducing the driver's anxiety.

Advantageous Effects of Invention

According to the invention, it is possible to provide a driving assistance apparatus capable of reducing the driver's anxiety.

DESCRIPTION OF EMBODIMENTS

Figure 1:
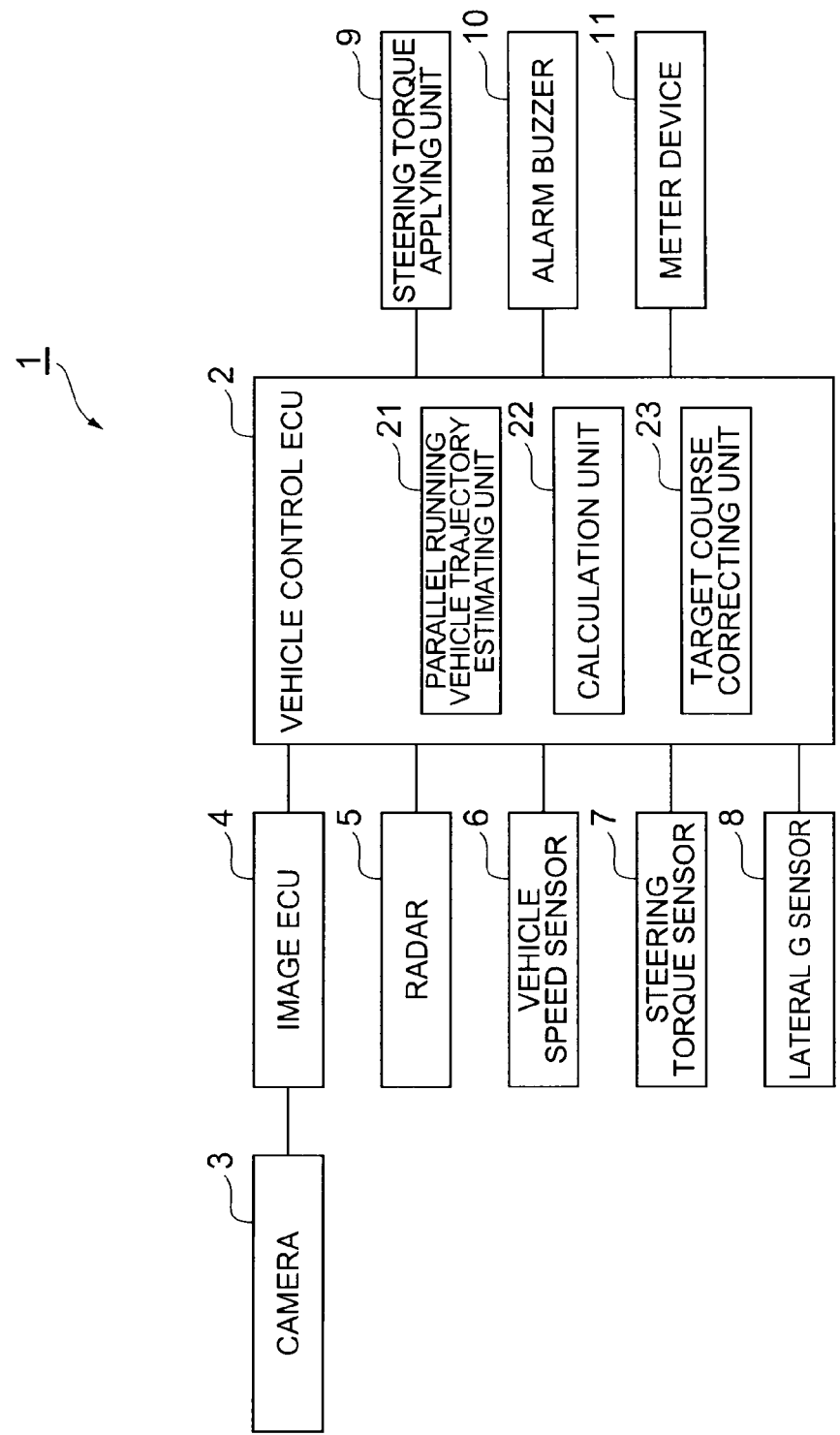
FIG. 1 is a block diagram showing a configuration of a driving assistance apparatus according to the embodiment.

An embodiment of the invention will be described with reference to the accompanying drawings. FIG. 1 is a block diagram showing a configuration of a driving assistance apparatus according to the embodiment. As shown in FIG. 1, a driving assistance apparatus 1 is a lane keeping apparatus which is mounted on a vehicle and assists a driving of the vehicle so that the vehicle runs along a set target course. The driving assistance apparatus 1 includes: a vehicle control ECU (Electronic Control Unit) 2; a camera 3; an image ECU (Electronic Control Unit) 4; a radar 5; a vehicle speed sensor 6; a steering torque sensor 7; and a lateral acceleration (lateral G) sensor 8.

The vehicle control ECU 2 is an electronic control unit that controls the entire apparatus, and includes: a CPU (Central Processing Unit), a ROM (Read Only Memory), a RAM (Random Access Memory), an I/O interface, and the like.

The camera 3 is, for example, a CMOS (Complementary Metal Oxide Semiconductor) camera, and is attached to the front side of the vehicle having the driving assistance apparatus 1 mounted thereon. At this time, it is desirable that the camera 3 is attached to the vehicle so that the optical axis direction thereof is aligned with the vehicle's advancing direction. The camera 3 captures an image of a road in front of the vehicle, and acquires the captured color image (for example, an image expressed by RGB (Red, Green, and Blue).

The camera 3 transmits data of the captured image in the form of image capturing signals to the image ECU 4. The camera 3 has a wide image capturing range in the transverse direction, and is able to sufficiently capture the image of (a pair of) both left and right white lines showing the driving lane. Further, the camera 3 is configured to acquire a color image, but may be configured to acquire a monochrome image since only the white lines on the road needs to be recognized.

The image ECU 4 includes: a CPU (Central Processing Unit), a ROM (Read Only Memory), a RAM (Random Access Memory), and the like. The image ECU 4 receives the image capturing signals from the camera 3, and recognizes the pair of white lines showing the driving lane on the basis of the image capturing data of the image capturing signals. Then, the image ECU 4 calculates the line (that is, the central line of the lane) passing through the center of the pair of white lines and the lane width on the basis of the recognized white lines. In addition, the image ECU 4 calculates the central radius (curve radius R) of the lane, the vehicle's direction (yaw angle $\theta$) with respect to the white line, and the vehicle's lateral deviation D. Then, the image ECU 4 transmits the information of the recognized white lines or the calculated information in the form of image signals to the vehicle control ECU 2.

The radar 5 scans the periphery of the own vehicle in the horizontal direction by transmitting detection waves such as a laser beam or a radio wave having a millimeter waveband, and detects a distance, a direction, a speed, and the like with respect to the other vehicles by receiving waves reflected from the surfaces of the other vehicles including an oncoming vehicle or the parallel running vehicle. The direction of the other vehicles is detected by using the angle of the reflected wave, the distance thereof is detected by using a time during which the radio wave is emitted and the reflected wave is returned, and the speed of the other vehicles is detected by using a variation in the frequency (Doppler Effect) of the reflected wave. Then, the radar 5 transmits the detected result to the vehicle control ECU 2.

The vehicle speed sensor 6 has a function of detecting a vehicle speed of the own vehicle, and outputting the detected vehicle speed in the form of vehicle speed signals to the vehicle control ECU 2. The vehicle speed sensor 5 is provided at, for example, each of four wheels, and detects the vehicle speed by measuring the rotation speed of each vehicle wheel. The steering torque sensor 7 detects a torque $\tau$ generated when the driver steers a steering wheel, and the lateral G sensor 8 detects a lateral acceleration of the own vehicle. The steering torque sensor 7 and the lateral G sensor 8 are respectively connected to the vehicle control ECU 2, and transmit the detected results to the vehicle control ECU 2.

Further, the driving assistance apparatus 1 includes: a steering torque applying unit 9; an alarm buzzer 10; and a meter device 11. The steering torque applying unit 9 performs a steering control that prevents the own vehicle from moving out of the lane. The steering torque applying unit 9 is, for example, an electric power steering device, and applies a steering torque to the vehicle wheel on the basis of the control of the vehicle control ECU 2 so that the own vehicle runs along the target course.

The alarm buzzer 10 rings so as to inform the driver that the own vehicle moves out of the lane or the possibility of moving out of the lane is high. The meter device 11 includes a multi-display unit (not shown) in addition to various meters or alarms. The meter device 11 receives signals from the vehicle control ECU 2, and displays information in accordance with the signals on the multi-display unit.

The vehicle control ECU 2 includes: a parallel running vehicle trajectory estimating unit 21; a calculation unit 22; and a target course correcting unit 23. The parallel running vehicle trajectory estimating unit 21 estimates the trajectory of the parallel running vehicle on the basis of information on the road captured by the camera 3 and the direction, the speed, and the like of the parallel running vehicle detected by the radar 5.

The calculation unit 22 performs various calculation processes involved with the vehicle control on the basis of signals from the image ECU 4, the radar 5, and the sensors 6, 7, and 8. For example, the calculation unit 22 calculates a lateral speed (hereinafter, referred to as a lateral speed) Vy of the parallel running vehicle on the basis of the position, the direction, the speed, and the like of the parallel running vehicle detected by the radar 5. Further, the calculation unit 22 calculates movement energy of the parallel running vehicle on the basis of the speed of the parallel running vehicle and the type (for example, the type and size of the vehicle) of the parallel running vehicle. Furthermore, the calculation unit 22 calculates a target lateral acceleration Gy*, a correction gain Kd, and a vehicle center position Doffset with respect to the center of the lane.

The target course correcting unit 23 corrects the target course of the own vehicle on the basis of the trajectory of the parallel running vehicle estimated by the parallel running vehicle trajectory estimating unit 21. Further, the target course correcting unit 23 is able to correct the target course of the own vehicle on the basis of the driver's steering input of the own vehicle when the parallel running vehicle is not present.

Figure 2:
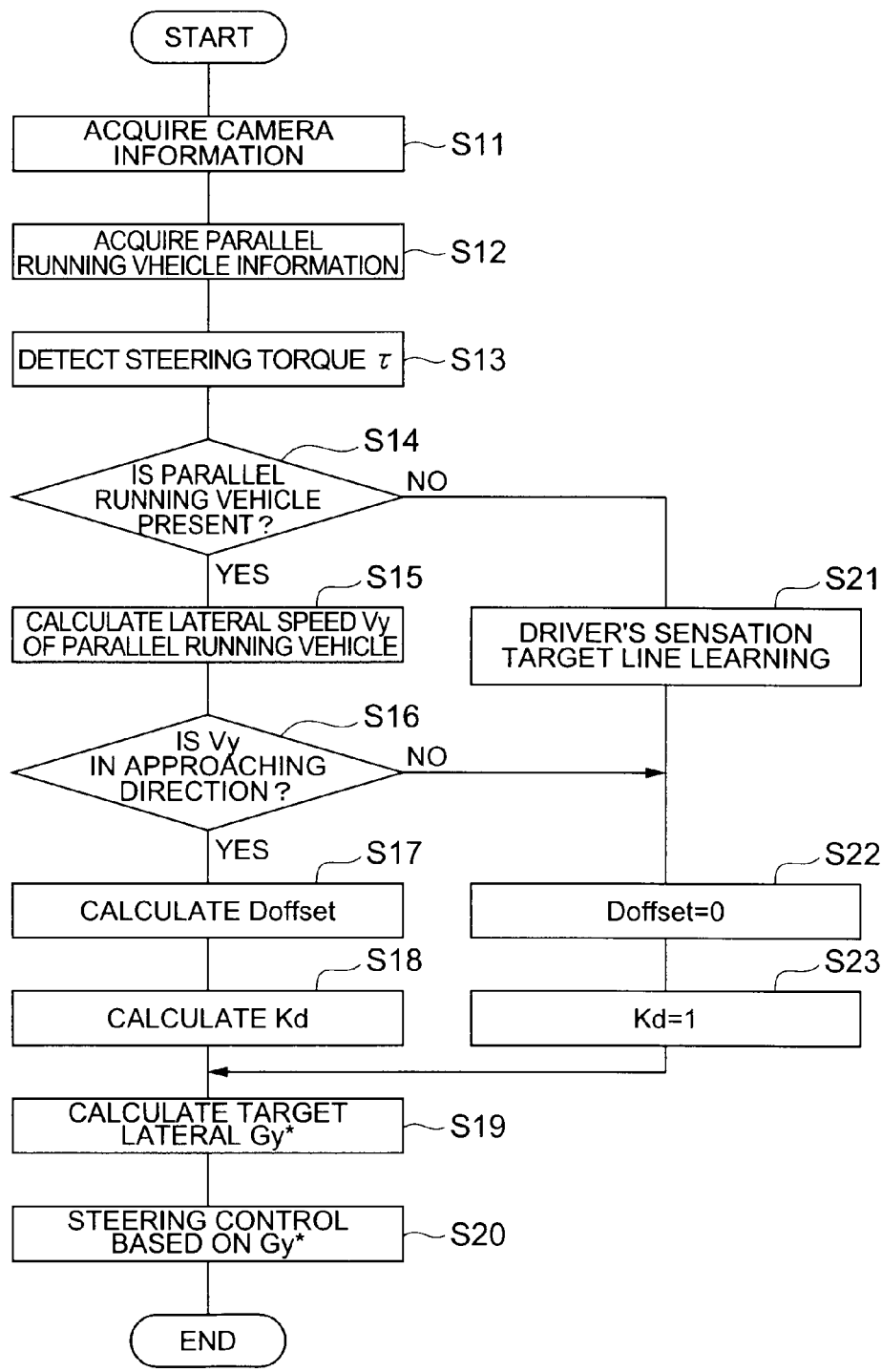
FIG. 2 is a flowchart showing the operation of the driving assistance apparatus according to the embodiment.

FIG. 2 is a flowchart showing the operation of the driving assistance apparatus according to the embodiment. The control process is repeated at a predetermined interval after, for example, an ignition is turned on. First, in the process of S11, the camera information is acquired. At this time, the vehicle control ECU 2 acquires information such as the curve R, the yaw angle $\theta$, and the lateral deviation D on the basis of the image signals transmitted from the image ECU 4.

In the process of S12 subsequent to the process of S11, the information of the parallel running vehicle is acquired. At this time, the vehicle control ECU 2 acquires information such as the position, the direction, and the speed of the parallel running vehicle detected by the radar 5. In the process of S13 subsequent to the process of S12, the steering torque $\tau$ is detected. At this time, the steering torque sensor 7 detects the steering torque $\tau$ of the own vehicle, and transmits the detected steering torque $\tau$ to the vehicle control ECU 2.

In the process of S14 subsequent to the process of S13, it is determined whether the parallel running vehicle is present. At this time, the vehicle control ECU 2 determines whether the parallel running vehicle is present in the adjacent lane on the basis of the information of the parallel running vehicle acquired from S12. When it is determined that the parallel running vehicle is present, the control process of S15 is performed, and the lateral speed Vy of the parallel running vehicle is calculated. At this time, the calculation unit 22 calculates the lateral speed Vy of the parallel running vehicle on the basis of the position, the direction, the speed, and the like of the parallel running vehicle acquired from S12.

In the process of S16 subsequent to the process of S15, it is determined whether the lateral speed Vy of the parallel running vehicle is present in the approaching direction. At this time, the vehicle control ECU 2 determines whether the lateral speed Vy of the parallel running vehicle detected from the process of S15 is present in the direction moving close to the own vehicle or the direction moving away from the own vehicle. Then, when it is determined that the lateral speed Vy of the parallel running vehicle is present in the approaching direction, the vehicle center position Doffset with respect to the center of the lane is calculated (S17).

Figure 3:
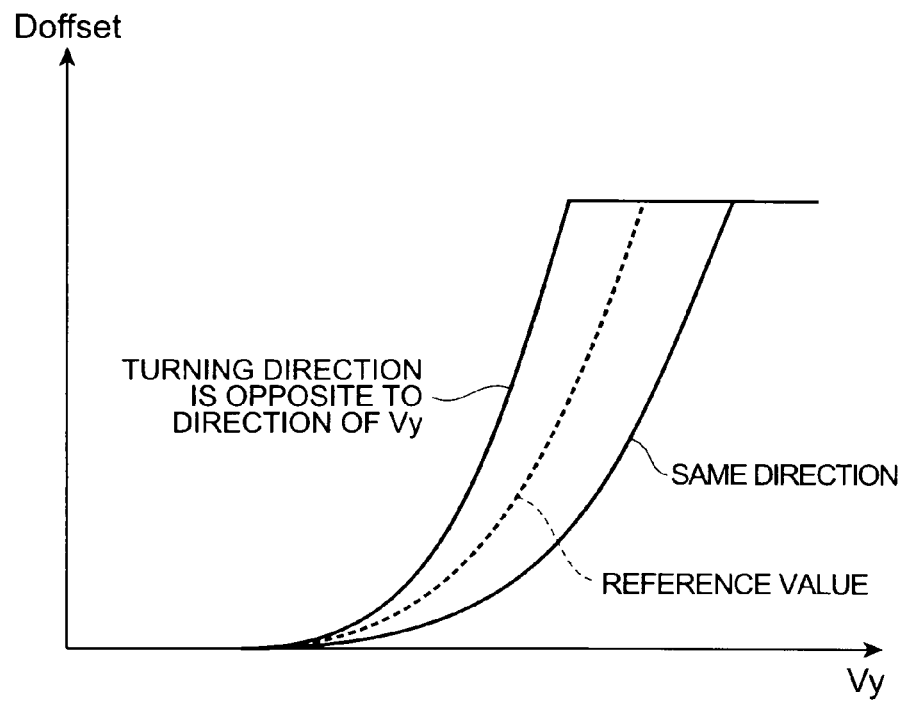
FIG. 3 is a graph showing a relationship between Doffset and lateral speed Vy of a parallel running vehicle.

FIG. 3 is a graph showing a relationship between Doffset and lateral speed Vy of a parallel running vehicle. In FIG. 3, the horizontal axis indicates the lateral speed Vy of the parallel running vehicle, and the vertical axis indicates Doffset. As shown in FIG. 3, when the turning direction of the own vehicle is opposite to the direction of the lateral speed Vy of the parallel running vehicle, that is, the parallel running vehicle approaches the own vehicle while generating the lateral speed Vy at the outside of the turning position, the running load of the parallel running vehicle is high, and the driver's unconscious anxiety of the own vehicle is large. For this reason, the Doffset is larger than the reference value. Accordingly, the target correction amount increases. On the other hand, when the turning direction of the own vehicle is equal to the direction of the lateral speed Vy of the parallel running vehicle, the Doffset is smaller than the reference value. Accordingly, the target correction amount is small.

Figure 4:
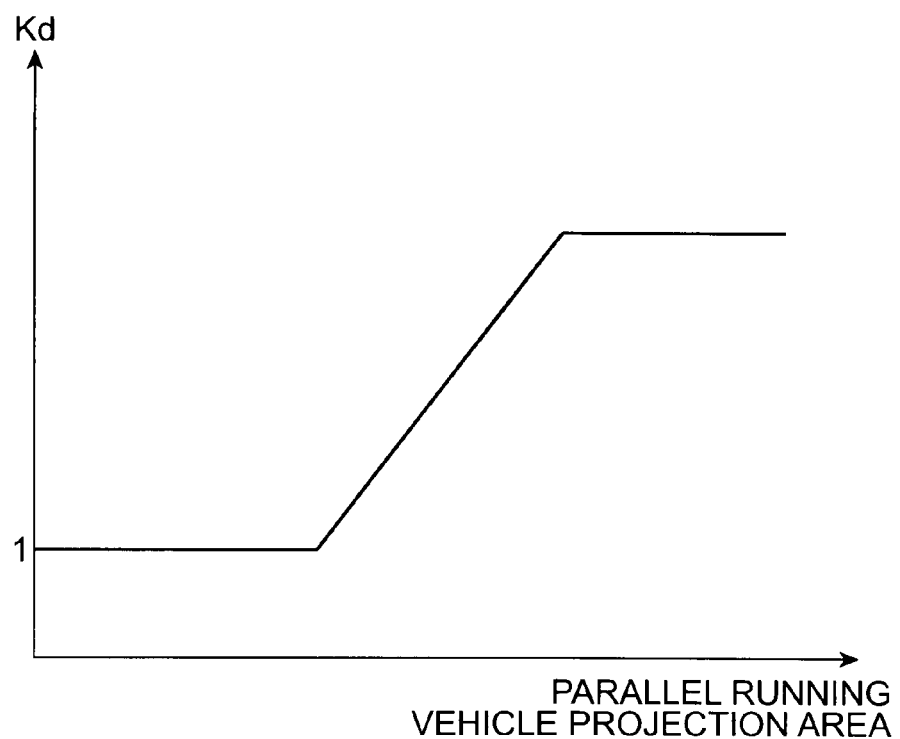
FIG. 4 is a graph showing a relationship between Kd and a parallel running vehicle projection area.

In the process of S18 subsequent to the process of S17, the correction gain Kd is calculated. FIG. 4 is a graph showing a relationship between Kd and a projection area of the parallel running vehicle. In FIG. 4, the horizontal axis indicates the parallel running vehicle projection area representing the movement energy of the parallel running vehicle, and the vertical axis indicates the correction gain Kd. As shown in FIG. 4, when the parallel running vehicle is a truck, an automobile, or the like and the sizes (movement energies) of the vehicles are different from each other, it is thought that the driver's anxiety may be different. For this reason, the correction gain Kd is changed by the use of the projection area which is considered to be proportional to the anxiety.

In the process of S19 subsequent to the process of S18, the target lateral acceleration (target lateral Gy*) is calculated. The target lateral Gy* is calculated by the equations (1) to (4). In the equations (2) to (4), K1, K2, and K3 denote coefficients, and V denotes a vehicle speed.

[Expression 1]

$$Gy^* = Gy1^* + Gy2^* + Gy3^* \quad (1)$$

$$Gy1^* = \frac{K1 \times V^2}{R} \quad (2)$$

$$Gy2^* = K2 \times \theta \quad (3)$$

$$Gy3^* = K3 \times (D + Kd \times Doffset + Dd) \quad (4)$$

In the process of S20 subsequent to the process of S19, the steering control is performed on the basis of Gy* calculated from S19. At this time, the vehicle control ECU 2 transmits control signals to the steering torque applying unit 9 on the basis of the calculated target lateral Gy*. The steering torque applying unit 9 receives the control signals and performs a steering control in accordance with the signals. Then, when the process of S20 ends, a series of control procedures end.

On the other hand, when it is determined that the parallel running vehicle is not present in the process of S14, the control process of S21 is performed, and the driver's sensation target line learning is performed. At this time, the vehicle control ECU 2 performs the control process as shown in FIG. 5, and performs the driver's sensation target line learning.

In the process of S22 subsequent to the process of S21, Doffset is set to 0, and in the process of S23, Kd is set to 1. Then, when the process of S23 ends, the control process of S19 is performed, the target lateral Gy* is calculated, and the steering control is performed on the basis of the calculated target lateral Gy* (S20).

Figure 5:
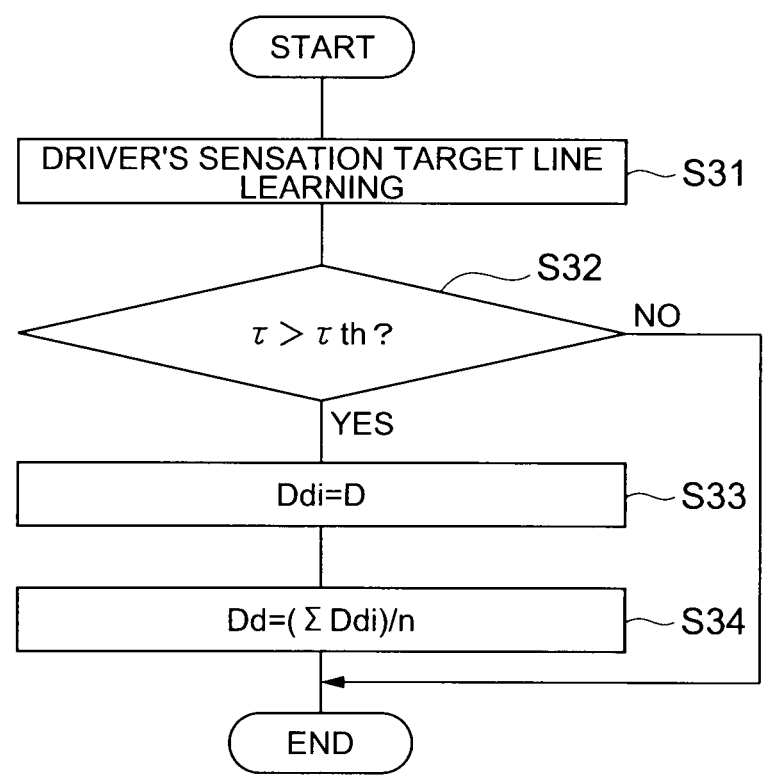
FIG. 5 is a flowchart showing a process of learning a driver's sensation target line.

FIG. 5 is a flowchart showing a process of learning the driver's sensation target line. Hereinafter, the control process of the driver's sensation target line learning will be described with reference to FIG. 5.

First, in the process of S31, the driver's sensation target line learning is performed. At this time, the vehicle control ECU 2 learns the driver's sensation target line when the parallel running vehicle is not present. In the process of S32 subsequent to the process of S31, it is determined whether the steering torque τ of the own vehicle is larger than the theoretical value τth. At this time, the vehicle control ECU 2 compares the steering torque τ of the own vehicle detected by the steering torque sensor 7 with the theoretical value τth.

When it is determined that the steering torque τ of the own vehicle is the theoretical value τth or less, the control process ends. On the other hand, when it is determined that the steering torque τ of the own vehicle is larger than the theoretical value τth, the control process of S33 is performed, and the process of Ddi=D is performed. In the process of S34 subsequent to the process of S33, the calculation of Dd=(ΣDdi)/n is performed. Then, when the process of S34 ends, a series of process procedures end.

Likewise, when the parallel running vehicle is not present, the vehicle control ECU 2 learns the driver's sensation target line, and learns Dd for correcting the center position of the driving lane as the reference of the control. Then, since the learned value is used to correct the target position when the parallel running vehicle is present, the correction is performed in accordance with the driver's sensation, thereby further reducing the driver's anxiety.

According to the driving assistance apparatus 1 with such a configuration, the trajectory of the parallel running vehicle running on the adjacent lane is estimated, and the target course of the own vehicle is corrected on the basis of the estimated trajectorys, thereby sufficiently reducing the driver's anxiety with respect to the parallel running vehicle. As a result, it is possible to realize the driving assistance of reducing the driver's anxiety.

Further, the above-described embodiment shows an example of the driving assistance apparatus according to the invention. The driving assistance apparatus according to the invention is not limited to the above-described embodiment. In the driving assistance apparatus according to the invention, the driving assistance apparatus according to the embodiment may be modified so that the concept of claims is not changed, or may be used in other applications.

For example, in the above-described embodiment, a case has been described in which the target course of the own vehicle is corrected on the basis of the movement energy of the parallel running vehicle and the lateral speed Vy of the parallel running vehicle. However, the invention is not limited thereto, and the target course may be corrected on the basis of the running load of the parallel running vehicle. Further, it is desirable that the running load is obtained on the basis of, for example, the direction and the magnitude of the road curvature in front of the parallel running vehicle.

REFERENCE SIGNS LIST

1: DRIVING ASSISTANCE APPARATUS
2: VEHICLE CONTROL ECU
3: CAMERA
4: IMAGE ECU
21: PARALLEL RUNNING VEHICLE TRAJECTORY ESTIMATING UNIT
23: TARGET COURSE CORRECTING UNIT

The invention claimed is:

1. A driving assistance apparatus that controls a vehicle travelling in a lane so that the vehicle runs along a set target course, the driving assistance apparatus comprising:
   means for detecting information regarding a parallel running vehicle travelling on a lane adjacent to the lane of the vehicle,
   calculation means for calculating a lateral speed of the parallel running vehicle and to determine a direction of the lateral speed of the parallel running vehicle based on the detected information, and
   correction means for correcting the set target course of the vehicle, so that the vehicle moves away from the parallel running vehicle, on the basis of the direction of the lateral speed of the parallel running vehicle being an approaching direction.

2. The driving assistance apparatus according to claim 1, wherein the correction means corrects the target course of the vehicle on the basis of the lateral speed and the direction of the lateral speed of the parallel running vehicle.

3. The driving assistance apparatus according to claim 1, wherein the calculation means calculates a running load of the parallel running vehicle and the correction means corrects the target course of the vehicle on the basis of the running load and the direction of the lateral speed of the parallel running vehicle, and the running load is calculated on the basis of a direction and a magnitude of the road curvature in front of the parallel running vehicle.

4. The driving assistance apparatus according to claim 1, wherein the calculation means calculates a movement energy of the parallel running vehicle based upon a type and size of the parallel running vehicle and the correction means corrects the target course of the vehicle on the basis of the movement energy and the direction of the lateral speed of the parallel running vehicle.

5. The driving assistance apparatus according to claim 1, wherein the correction means corrects the target course of the vehicle on the basis of a driver's steering input of the vehicle when the parallel running vehicle is not present.

6. The driving assistance apparatus according to claim 1, wherein the target course correction means corrects the target course of the vehicle so that the vehicle moves away from the parallel running vehicle if a turning direction of the vehicle is opposite to the direction of the lateral speed of the parallel running vehicle.

7. A driving assistance apparatus that controls a vehicle traveling in a lane so that the vehicle runs along a target course, the driving assistance apparatus comprising:
   a radar to detect information regarding a parallel running vehicle travelling on a lane adjacent to the lane of the vehicle,
   a calculation unit to calculate a lateral speed of the parallel running vehicle and to determine a direction of the lateral speed of the parallel running vehicle based on the detected information, and
   a target course correction unit to correct the target course of the vehicle, so that the vehicle moves away from the parallel running vehicle, on the basis of the direction of the lateral speed of the parallel running vehicle being an approaching direction.

8. The driving assistance apparatus according to claim 7, wherein the target course correction unit corrects the target course of the vehicle based on the lateral speed and the direction of the lateral speed of the parallel running vehicle.

9. The driving assistance apparatus according to claim 7, wherein the calculating unit calculates a running load of the parallel running vehicle and the target course correction unit corrects the target course of the vehicle based on the running load and the direction of the lateral speed of the parallel running vehicle.

10. The driving assistance apparatus according to claim 9, wherein the running load is calculated on the basis of a direction and a magnitude of the road curvature in front of the parallel running vehicle.

11. The driving assistance apparatus according to claim 7, wherein the calculating unit calculates a movement energy of the parallel running vehicle based upon a type and size of the parallel running vehicle and the target course correction unit corrects the target course of the vehicle based on the movement energy and the direction of the lateral speed of the parallel running vehicle.

12. The driving assistance apparatus according to claim 7, wherein the target course correction unit corrects the target course of the vehicle based on driver steering input to the vehicle when the parallel running vehicle is not present.

13. The driving assistance apparatus according to claim 7, wherein the target course correction unit corrects the target course of the vehicle so that the vehicle moves away from the parallel running vehicle if a turning direction of the vehicle is opposite to the direction of the lateral speed of the parallel running vehicle.

14. The driving assistance apparatus according to claim 13, wherein a target correction amount is larger (i) if the turning direction of the vehicle is opposite to the direction of the lateral speed of the parallel running vehicle than (ii) if the turning direction of the vehicle is the same as the direction of the lateral speed of the parallel running vehicle.

15. The driving assistance apparatus according to claim 7, wherein the calculating unit calculates a movement energy of the parallel running vehicle based upon a type and size of the parallel running vehicle and the target course correction unit corrects the target course of the vehicle based on a correction gain proportional to the movement energy of the parallel running vehicle.

16. The driving assistance apparatus according to claim 7, wherein the calculation unit calculates a center offset of the vehicle with respect to a center of a lane including the vehicle.

17. The driving assistance apparatus according to claim 16, wherein the calculating unit calculates a running load and a movement energy of the parallel running vehicle based upon a type and size of the parallel running vehicle and the target course correction unit corrects the target course based on the running load and a product of the center offset of the vehicle and a correction gain proportional to the movement energy of the parallel running vehicle.

18. The driving assistance apparatus according to claim 17, wherein the calculation unit calculates a target lateral acceleration based on the parallel running vehicle running load and the product of the center offset of the vehicle and the correction gain, and the target course correction unit corrects the target course based on the target lateral acceleration and the direction of the lateral speed of the parallel running vehicle.

19. The driving assistance apparatus according to claim 13, wherein a target correction amount is larger (i) if the turning direction of the vehicle is opposite to the direction of the lateral speed of the parallel running vehicle than (ii) if the turning direction of the vehicle is the same as the direction of the lateral speed of the parallel running vehicle.

20. A method of controlling a vehicle traveling in a lane so that the vehicle runs along a target course, comprising:
   detecting information regarding a parallel running vehicle travelling on a lane adjacent to the lane of the vehicle,
   calculating a lateral speed of the parallel running vehicle,
   determining a direction of the lateral speed of the parallel running vehicle based on the detected information,
   correcting the target course of the vehicle, so that the vehicle moves away from the parallel running vehicle, of the parallel running vehicle on the basis of the direction of the lateral speed of the parallel running vehicle being an approaching direction.

\* \* \* \* \*